United States Patent [19]

Roudaut

[11] Patent Number: 5,040,836
[45] Date of Patent: Aug. 20, 1991

[54] ELECTRICALLY OPERATED PINCERS WITH MAGNETIC RETENTION

[76] Inventor: Philippe L. R. Roudaut, 142, rue du Général Lecler, 95120 Ermont, France

[21] Appl. No.: 339,393

[22] Filed: Apr. 18, 1989

[30] Foreign Application Priority Data

Apr. 26, 1988 [FR] France .................................. 88 05730

[51] Int. Cl.$^5$ .............................................. B25J 15/08
[52] U.S. Cl. .................................. 294/88; 294/116; 901/38
[58] Field of Search .................. 294/88, 106, 115, 116, 294/907; 901/31–39, 46

[56] References Cited

U.S. PATENT DOCUMENTS

| 3,370,213 | 2/1968 | Rose | 294/115 X |
| 4,113,115 | 9/1978 | Yoshio | 901/38 X |

FOREIGN PATENT DOCUMENTS

| 2851961 | 6/1979 | Fed. Rep. of Germany | 901/38 |
| 2581914 | 11/1986 | France | 901/38 |
| 2587929 | 4/1987 | France | 901/38 |
| 1261793 | 10/1986 | U.S.S.R. | 901/38 |
| 1266737 | 10/1986 | U.S.S.R. | 901/38 |
| 1313705 | 5/1987 | U.S.S.R. | 901/38 |
| 972415 | 10/1964 | United Kingdom . | |

Primary Examiner—Johnny D. Cherry
Attorney, Agent, or Firm—Laff, Whitesel, Conte & Saret

[57] ABSTRACT

The pincers comprise a gripping head (1) and a control device (2). The control device (2) contains a direct-current electric motor (12-13) which is supplied, through a control circuit (38), from a current-feed source (39). In addition, it comprises a commutable system of permanent magnets. The rotor (12) of the motor is integrally locked to an axle (11) which is capable of actuating the gripping head (1), which is installed in the body of the control device (2), and which is displaceable axially between two positions. The stator (13) is installed in such a way as to be free to revolve between two limiting angular positions and is integrally locked to a first part (27-28) of the commutable system of permanent magnets, which is integrally locked to a support (15) of the axle (11). The second part (29-30) is integrally locked to the body of the control device (2). These two parts are attracted to each other when the stator (13) is occupying its first angular position. They repel each other when the stator (13) is occupying its second angular position. At each such angular position, there is an associated sensor (34 or 35) which transmits a signal to the control circuit (2) whenever the stator is in the limiting angular position corresponding thereto.

17 Claims, 5 Drawing Sheets

ELECTRICALLY OPERATED PINCERS WITH MAGNETIC RETENTION

The present invention relates to electrically operated pincers with magnetic retention and, more especially, to pincers that can be utilized in the field of automation to perform operations such as the gripping of objects to be moved. Hereinafter, the term "pincers" will be used to designate the assembled whole of the gripping head, with its claws, and of a device for controlling the claws of the gripping head.

In practical terms, the "master-slave" manipulators are envisioned with a view to their ability to move objects, one at a time, in the light of which the mass of the object and that of the pincers must not exceed a predetermined maximum value. Consequently, the pincers must have as little mass as possible in order to enjoy a greater margin of maneuver insofar as the objects to be moved are concerned.

The pneumatically operated pincers fulfill this requirement. In fact, their means of control are limited to a case and an actuator, the cylinder of which latter is practically empty. On the other hand, in the electrically operated pincers, the control device comprises, in addition to the case, the electric motor which is relatively heavy for two reasons: It must perform rapidly in the approach-phase of the jaws; and it must be able to cause the jaws to exert a retaining force that is even greater than the weight of the object to be moved. These two requisites, rapidity and force, are satisfied with the choice of an electric motor having sufficient power. In workshops, preference is given to the use of direct-current electric motors that function at a low voltage level—for example, 24 V, which voltage generally serves to supply the robots with current. Now then, the mass of an electric motor running on direct current, thus supplied, increases more quickly than does its power.

In document FR-A-2 581 914, it was proposed that two independent electric motors be utilized: one to ensure the control of opening and the preliminary stage of closing, and the other to ensure the closing itself. This arrangement makes for a complicated and relatively heavy structure.

An object of the invention consists of providing for a form of electrically operated pincers which is lighter in weight than those already known and which has a relatively simple structure.

According to one feature of the invention, these electrically operated pincers are so envisioned that the control device thereof comprises a direct-current electric motor which is supplied, through a control circuit, from a current-feed source and a commutatable system of permanent magnets, with the rotor of the electric motor being integrally locked to an axle that is capable of actuating the gripping head by a means of transferring rotational movement, said axle being installed in the body of the control device and being displaceable axially between two positions, while the stator of the electric motor is installed so as to be free to revolve between two limiting angular positions and is integrally locked to a first part of the commutatable system of permanent magnets, which first part is integrally locked to support means of the axle, while the second part of the commutatable system of permanent magnets is integrally locked to the body of the control device, both said parts of the commutatable system of permanent magnets being attracted to each other when the stator is occupying its first angular position, and repelling each other when the stator is occupying its second angular position, while at each limiting angular position of the stator there is associated a sensor which sends a signal to the control circuit whenever the stator happens to be in the limiting angular position corresponding thereto.

According to another feature, the stator is integrally locked to a first part of the commutatable system of permanent magnets through the medium of a freely rotating member which is supported by a bearing, which latter is locked integrally to the axle.

According to yet another feature, said member is a ring.

According to yet another feature, said bearing is a ball-bearing, the external race of which is locked integrally to the ring and the internal race of which is locked integrally to said axle.

According to yet another feature, each part of the commutatable system of permanent magnets is constituted by a pair of permanent magnets, the flux of which is generally axial in direction, one of these magnets having its North-seeking (red) pole in one direction and the other magnet having said pole in the other direction, with the two magnets of a given pair being situated in positions diametrically opposite each other, just as the two limiting angular positions of the stator.

According to yet another feature, a stop serves to restrict the minimum gap between the two parts of the commutatable system of permanent magnets when they are in a position of attraction.

According to yet another feature, an axial stop, locked integrally with the body of the control device, is provided for the purpose of limiting the displacement of said axle when the two parts of the commutatable system of permanent magnets are in the position wherein they repel each other.

The abovementioned features of the invention, as well as yet other features, will emerge more clearly when the following description of an exemplified embodiment is read, said description being drawn up in relation to the attached drawings, among which:

Figure 1:
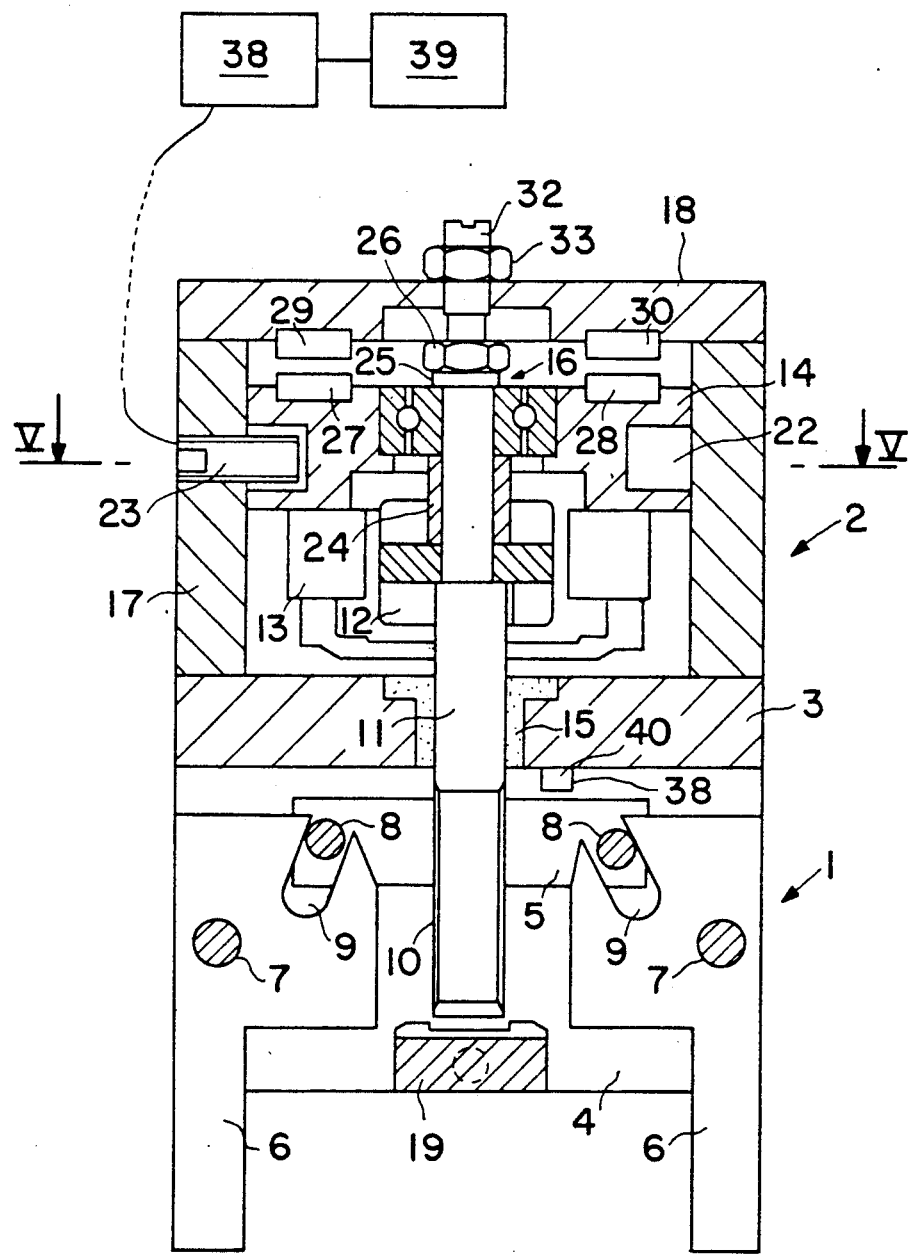
FIG. 1 is a view in longitudinal section of a form of pincers according to the invention, the claws of the pincers being in a closed position.
Figure 2:
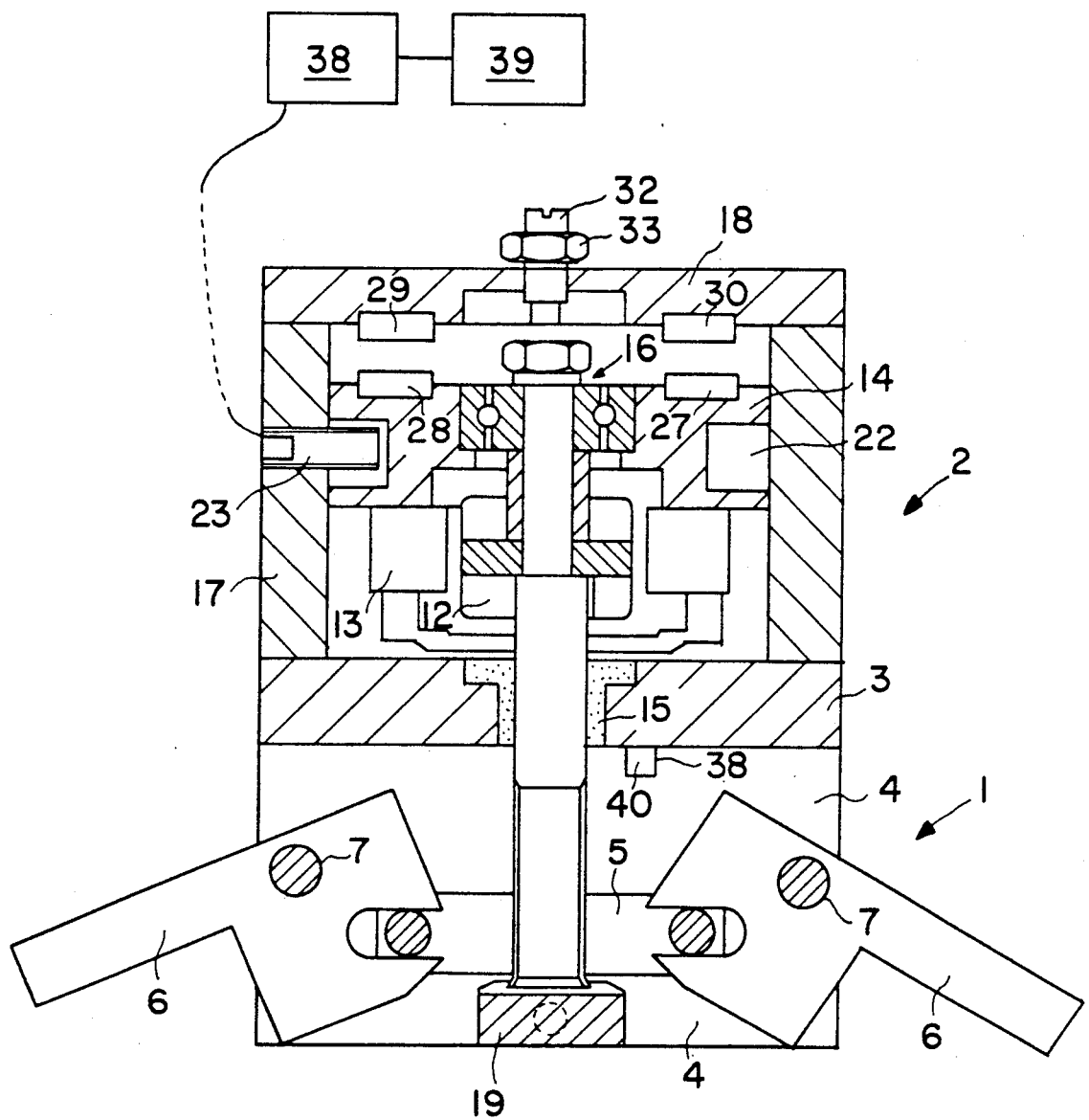
FIG. 2 is a view in longitudinal section of the pincers of FIG. 1, the claws of the pincers being in an open position.
Figure 3:
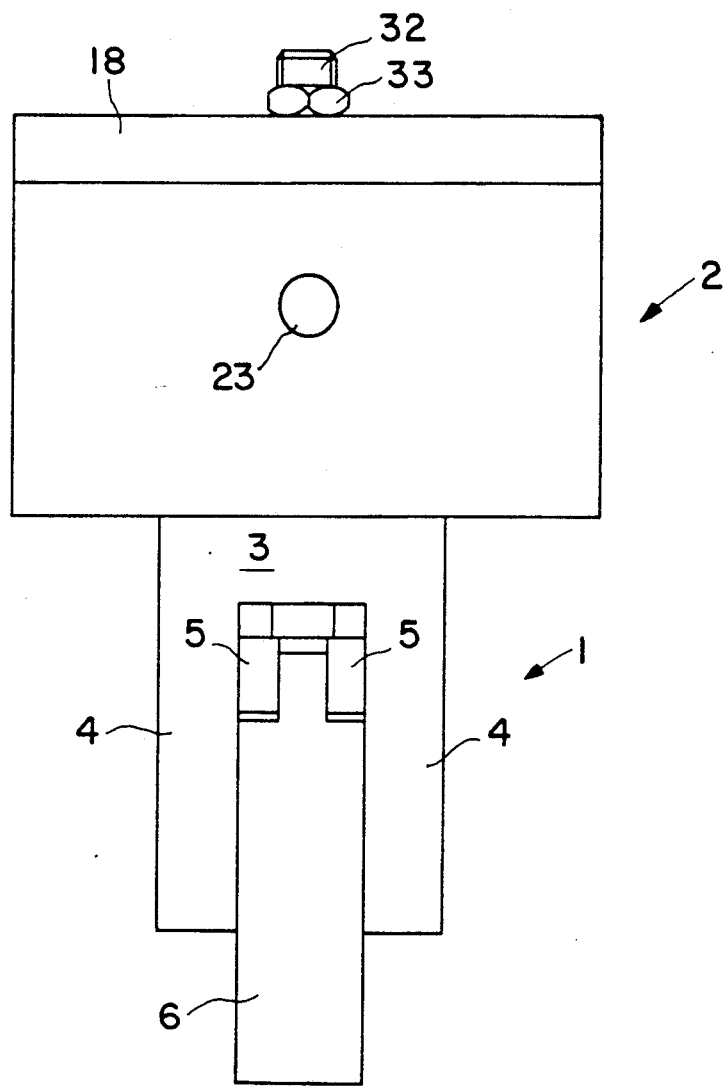
FIG. 3 is a side-view of the pincers of FIG. 1.

In the pincers of FIGS. 1 through 3, the gripping head 1 and the control device 2 can be distinguished. Said gripping head 1 is of the type described in French patent application FR-A-2 592 827, entitled "Pneumatically operated pincers". It comprises a base 3, which is prolonged by two parallel longitudinal wings 4, a member 5 which is movable in longitudinal translation, and two claws or jaws 6 which respectively can revolve around two transverse axles 7, the ends of which axles are respectively borne by said two wings 4. The movable member 5 bears two small bars 8 which are respectively engaged in slots 9 of the claws 6. The base 3 of the gripping head 1 is, with its wings 4, integrally locked with the body of the control device, for example by means of screws.

Said member 5 has the external form of a parallelepiped and it cannot revolve between the wings 4. It comprises, as a nut, a threaded axial hole into which is screwed a threaded portion 10 of a longitudinal axle 11, which passes through the base 3 of the head 1 so as to enter into the control device 2. Thus, the member 5 acts in the manner of a locked-rotation nut upon the screw 10. When said screw 10 of axle 11 is caused to revolve in one direction or the other, the nut 5 withdraws more or less from the base 3, with the result that the small bars 8 penetrate more or less into the slots 9 of the claws 6 which diverge more or less.

In the control device 2, the axle 11 is caused to rotate by the rotor 12 of a direct-current motor, of which the stator 13 is integrally locked to a disk 14 which is capable of revolving around said axle 11. This direct-current motor is, for example, of the type known as a direct-current-coupled motor that belongs to the "SMOP" series which is marketed by the French firm of PRECILEC S.A.

In practical terms, the axle 11 swivels in a plain journal bearing 15 which is housed in the base 3 of the gripping head 1 and in the inner ring of a ball-bearing 16. The external race of said ball-bearing 16 is integrally locked to the disk 14. The body of the control device 2 comprises a cylindrical side-wall 17, the internal diameter of which makes possible the rotation of said disk 14. One frontal extremity of the wall 17 is, as already mentioned, connected by screws to the outer surface of the base 3 of the gripping head, while the other frontal extremity thereof is closed off by a circular bottom 18. The plain journal bearing 15 leaves the axle 11 free to move in the longitudinal direction. On the other hand, the axle is integrally locked to the inner ring of the ball-bearing 16.

Figure 4:
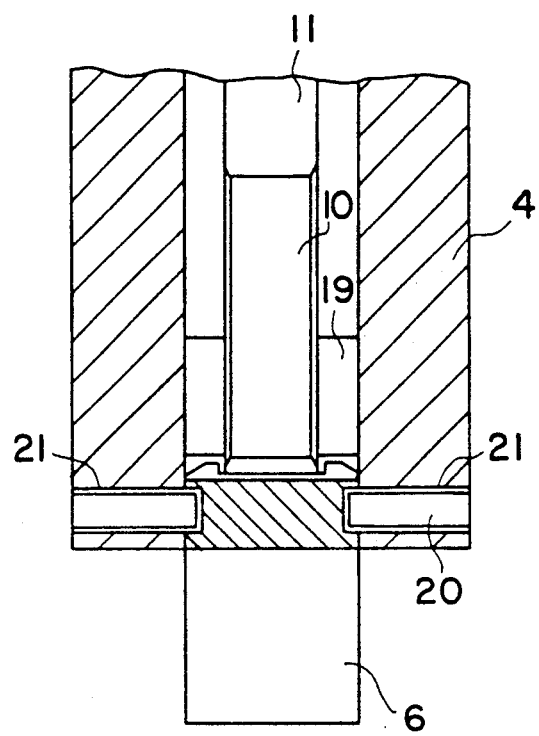
FIG. 4 is a partial view in longitudinal section, illustrating the operation of the stop for opening the gripping head.

Outside of the control device 2, beyond the threaded portion 10 of the axle 11, there is provided an axial stop 19 which is locked in rotation by the wings 4. Said stop 19 is locked longitudinally by gudgeons 20 (see FIG. 4), which are set in holes 21 perforated in the wings 4. Only two gudgeons 20, diametrically opposite each other, have been shown in FIG. 4; however, in order to prevent the possible rotation of the axial stop around these gudgeons, provision may be made for one or more oblique gudgeons additionally or for any other equivalent means. As will be seen hereinunder, when an object is grasped, the end of the axle 11 diverges from the axial stop 19, as is shown in FIG. 1. In this case, an axial guidance means of the axle 11 may also be provided for.

Figure 5:
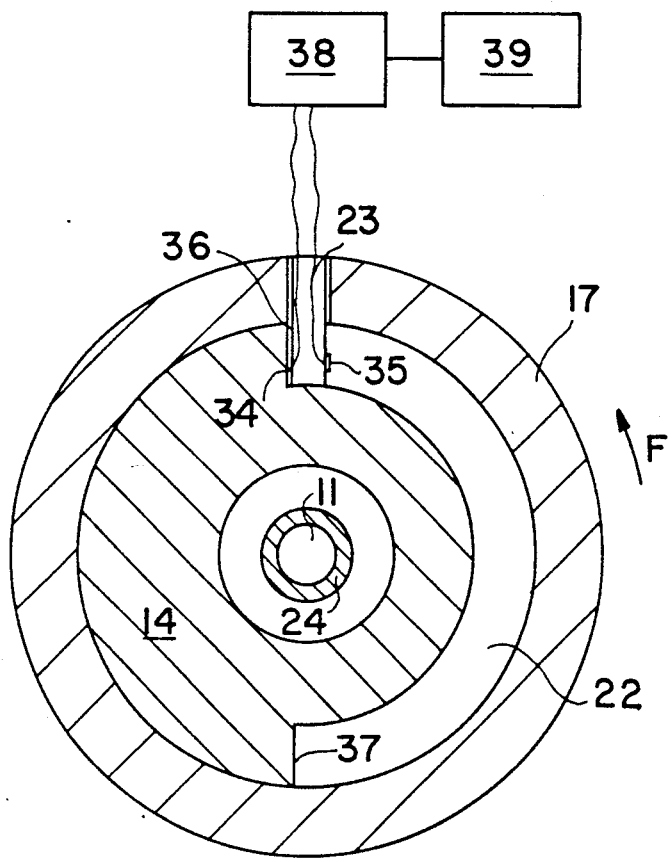
FIG. 5 is a view in transverse section along the V—V line of FIG. 1.

On its external lateral surface, the disk 14 exhibits a semi-circular groove 22, which is particularly visible in FIGS. 1 and 5. In a radial hole which has been perforated in the cylindrical wall 17 and which is located opposite the groove 22, there is emplaced a stop 23 which limits the rotation of said disk 14 to half of a revolution in one direction or the other, as is shown in FIG. 5. The depth of the groove 22 is slightly greater than the thickness of the stop 23.

As shown in FIG. 1, the axle 11 also presents, in the control device 2, a shoulder against which the rotor 12, threaded onto the axle, is locked through the medium of a tubular casing 24 which serves as a spacer between said rotor 12 and the inner ring of the ball-bearing 16, and through the medium of this inner ring, of a washer 25 and of a nut 26, which nut is screwed onto the corresponding extremity of said axle 11.

On its surface which lies on the other side of the stator 13, the disk 14 bears a pair of flat permanent magnets 27, 28, the positions of which are diametrically opposite each other and correspond, respectively, to the limits of the semi-circular groove 22. The North-seeking pole of magnet 27 is rotated towards the bottom 18 and its South-seeking pole is rotated towards the disk 14. The South-seeking pole of magnet 28 is rotated towards the bottom 18 and its North-seeking pole is rotated towards the disk 14. The material of the disk 14 is such that it also plays the role of an antimagnetic screen between magnets 27 and 28, on the one hand, and the permanent magnets of the electric motor, on the other hand.

Figure 6:
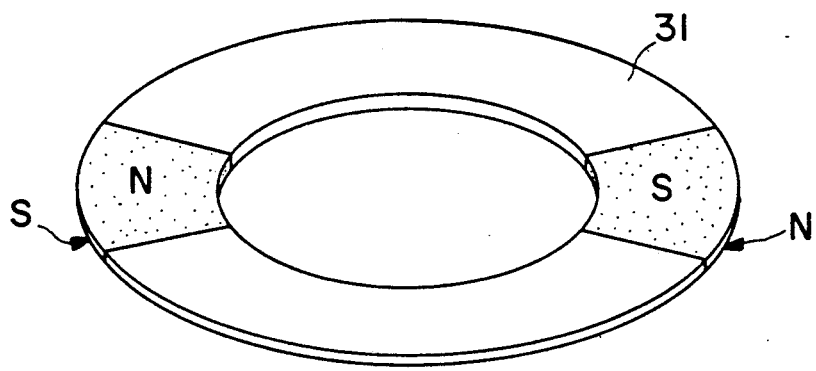
FIG. 6 is a perspective view, showing a form of practical embodiment of a pair of permanent magnets that can be utilized in the control device of the pincers of FIG. 1.

The bottom 18 likewise bears a pair of flat permanent magnets 29, 30, the positions of which are likewise diametrically opposite each other. In FIG. 1, which relates to the "closed" position of the claws of the pincers, magnet 29 is opposite magnet 27, and magnet 30 is opposite magnet 28. The South-seeking pole of magnet 29 is rotated towards the disk 14 and its North-seeking pole is rotated towards the bottom 18. The North-seeking pole of magnet 30 is rotated towards the disk 14 and its South-seeking pole is rotated towards the bottom 18. In practice, magnets 27 and 28, on the one hand, and magnets 29 and 30, on the other hand, can respectively form part of a magnetic ring 31, such as the one shown in FIG. 6.

At the center of the bottom 18 there is provided an axial threaded hole into which is screwed a screw 32, which passes through said bottom 18. A lock-nut 33 is screwed around the external portion of said screw 32 so as to lock it. In practical terms, the screw 32 serves as a stop against an excessive degree of upward axial movement of the axle 11, with the nut 26 proceeding to abut against the end of the screw 32, as shown in FIG. 1.

Two sides of the gudgeon 23, within the groove 22, are provided with proximity sensors 34, 35, which are activated respectively whenever extremity 36 or extremity 37 of the groove 22 were to come into contact with the corresponding side of said gudgeon 23. Said sensors 34, 35 are respectively connected by electric wires to a control circuit 38 which governs the current-feed source 39 of the electric motor 12-13. The electric wires connecting said source 39 to the electric motor have not been represented.

Another proximity sensor 40 is installed between the base 3 of the gripping head 1 and the movable member 5. Said sensor 40 is likewise connected to the control circuit 38.

These proximity sensors 34, 35 and 40 may be conventional proximity contacts or they may consist of small magnets housed in one of the surfaces, which come into contact, while the other surface bears a sealed contact. On the connecting wires of the sensors there are preferably installed electro-luminescent diodes or LEDs (i.e., light-emitting diodes), which are attached to the visible surfaces of the pincers.

Figure 7:
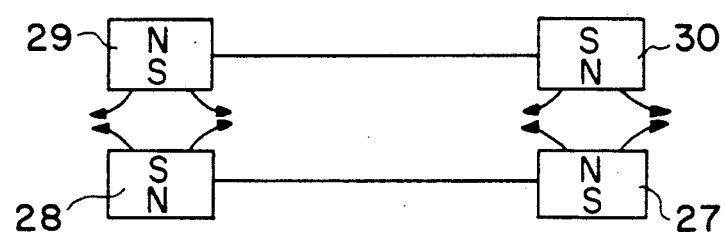
FIGS. 7 and 8 are schematic views, illustrating the operation of the system of permanent magnets for the control device of the pincers of FIG. 1.

The operation of the pincers according to the invention will now be described, given the supposition that the initial position is the one shown in FIG. 2, with the claws opened. The pairs of magnets 27-28 and 29-30 are then in the position shown in FIG. 7, which is to say that the two pairs of magnets are repelling each other. The disk 14 has diverged from the bottom 18 and the ball-bearing 16 has drawn the axle 11 downwards, as evidenced by FIG. 2.

Figure 8:
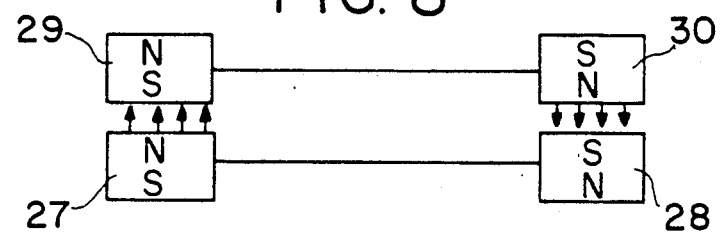

In order to control the gripping of an object, the control circuit 38 commutates the source of current-feed 39 to the state of current-feeding into the motor 12-13, in such a way that the axle 11 rotates in the direction whereby the threaded portion 10 will screw into the member 5. Said member 5 draws nearer to the base 3, with locking of the claws 6, the slots 9 of which are driven by the small bars 8. When the claws 6 come into contact with the object that is to be transported, the reaction exerted by the surface of the object provokes an arrest in the movement of the member 5, and, accordingly too, in the rotation of the axle 11 and of the rotor 12. Inasmuch as the rotor is no longer able to revolve, it is now the stator 13 that revolves; however, it does so in the direction opposite to that in which the rotor was previously revolving. The rotation of the stator 13—which is integrally locked to the disk 14—in the direction indicated by arrow F (see FIG. 5), is restricted to a half-revolution by the radial stop 23 which is housed in the groove 22. With the disk 14 revolving with the stator 13, the pair of magnets 27-28 now assumes the position shown in FIGS. 1 and 8. The pairs of magnets attract each other, the result of which is to raise the disk 14, the ball-bearing 16, the axle 11 and the member 5. The raising of said member 5 pulls on the small bars 8, which then tend to effect a better closing of the claws 6. The upward movement, as evidenced in FIG. 1, is limited by the flexibility of the contact between the claws and the object being grasped, and possibly by the tip of the screw 32 against which the upper end of the axle 11 comes to rest.

In other respects, as soon as the disk 14 has revolved with the stator 13, the proximity sensor 35 transmits a signal to the control circuit 38 which commutates the source 39 so as to cut off the current-feed of the electric motor.

In order to open the pincers again, the control circuit 38 commutates the source 39 which feeds current to the motor 12-13, in such a way as to cause the axle 11 to rotate in the direction of arrow F, (FIG. 5). The member 5 then withdraws from the base 3, causing the claws 6 to separate. When said member 5 reaches the end of the threaded portion 10, or the approximate position shown in FIG. 2, the rotor 12 is arrested and the stator revolves in the direction opposite that of arrow F, (FIG. 5). The pair of magnets 27-28 assume once again the position shown in FIG. 2 and are repelled by the other pair of magnets 29-30. The disk 14, the ball-bearing 16, the axle 11 and the member 5 all descend. Moreover, the disk 14 having completed one-half of a revolution, the contact sensor 35 now transmits a signal to the control circuit 38, which commutates the source 39 so as to cut off the feeding of current to the electric motor.

The control circuit 38 is capable of interpreting the signals transmitted by sensors 34 and 35, and of taking them into consideration solely upon each change in angular position. Between two changes in angular position, the control circuit does not take into consideration the signals thus received. By way of preference, the control circuit functions with a microprocessor which has been programmed to sequence the closing and opening operations of the pincers, in addition, as it were, to other functions such as rotation of the arm bearing the pincers, etc.

It appears that, in the closing position, practically the entire effort of retaining the object between the claws 6 is provided by the force of attraction of magnets 27 and 29, on the one hand, and of magnets 28 and 30, on the other hand. The electric motor 12-13 thus serves, practically speaking, only to displace the claws 6, which does not require an excess of power, even at high speed. Therefore, the weight of the electric motor may remain main within limits that are comparable with those of the motor utilized for pneumatic actuators. Furthermore, in the event of a breakdown affecting the direct current, the permanent magnets continue to exert their power of attraction and the grasped object remains between the claws 6.

In the course of this description, mention has been made of the clearance between the stop 23 and the borders of the groove, of the fact that the bearing 15 is smooth, and of the fact that the end of the axle 11 can rise above the stop 19. These precautions are taken in order to permit the axle 11 to undergo modest movements of ascending and descending. In other respects, the stop constituted by the screw 32 makes it possible to maintain a reasonable gap between the pairs of attracting magnets. This stop is necessary to prevent the magnets from adhering to each other, or even from approaching each other too closely. The fact that this stop is adjustable by rotation of the screw 32 in the hole of the bottom 18 permits adjustment of the gap—that is to say, the effort required of the stator to cause the disk 14 to revolve in the direction contrary to that of arrow F, (FIG. 5). It must be noted that this effort of the stator is relatively limited, because the magnets move in their plane in relation to the stationary magnets. Thus, there is only a flux-shearing effort.

The proximity sensor 40 serves to ascertain the closing of the pincers without the seizing of an object. The control circuit may then interpret this situation and, for example, cause the pincers to execute a new gripping cycle, or it may even activate an alarm, etc.

I claim:

1. An electrically operated pincers with magnetic retention, said pincers comprising a gripping head and a control device; said control device having a body and including a control circuit, a current-feed source, a direct current electric motor supplied through said control circuit to said current-feed source; a commutable system of permanent magnets; the electric motor having a rotor integrally locked onto an axle for actuating the gripping head in response to transferring rotational movement to said head, said axle having a support means and being in the body of the control device; means for axially displacing said axle between two positions; the electric motor further having a stator which is free to revolve between two limiting angular positions and which is integrally locked to a first part of the commutable system of permanent magnets, said first part being integrally locked to said support means for the axle, a second part of the commutable system of permanent magnets being integrally locked to the body of the control device; both of said parts of the commutable system of permanent magnets being attracted to each other when the stator is occupying its first angular position, and repelling each other when the stator is occupying its second angular position; and sensor means at each limiting angular position of the stator for transmitting a signal to the control circuit whenever the stator is in the limiting angular position corresponding thereto.

2. The pincers of claim 1 and a freely rotating member supported by a bearing, which is locked integrally to the axle, the stator being integrally locked to the first part of the commutable system of permanent magnets through the medium of said bearing.

3. The pincers of claim 2, wherein said member is a ring.

4. The pincers of claim 3, wherein said bearing has a ball-bearing with an external race which is integrally locked to the ring and an internal race which is integrally locked to said axle.

5. The pincers according to any one of the claims 1 through 4, wherein each part of the commutable system of permanent magnets comprises a pair of permanent magnets having a flux which is generally axially directed, said magnets having adjacent north-seeking poles reversed with respect to its neighboring magnets, with two magnets of any given pair of magnets being situated in positions which are diametrically opposite each other as the two limiting angular positions of the stator.

6. The pincers according to any one of the claim 1 through 4, and an adjustable stop for limiting a minimum gap between the two parts of the commutable system of permanent magnets when they are in a position of attraction.

7. The pincers according to any one of claim 1 through 4, and an axial stop, integrally locked to the body of the control device for limiting displacement of said axle when the two parts of the commutable system of permanent magnets are in a position wherein they repel each other.

8. The pincers according to claim 5, and an adjustable stop for limiting a minimum gap between the two parts of the commutable system of permanent magnets when they are in a position of attraction.

9. The pincers according to claim 5, and an axial stop, integrally locked to the body of the control device for limiting displacement of said axle when the two parts of the commutable system of permanent magnets are in a position wherein they repel each other.

10. The pincers according to claim 6, and an axial stop, integrally locked to the body of the control device for limiting displacement of said axle when the two parts of the commutable system of permanent magnets are in a positon wherein they repel each other.

11. Electrically operated pincers with magnetic retention, comprising a gripping head (1), means for transferring a rotational motion, a control circuit (38), a control device (2), including a body and a direct-current electric motor (12-13) which is supplied through said control circuit (38) from a current-feed source (39), a commutatable system of permanent magnets, said electric motor having a rotor (12) and a stator (13), said rotor being integrally locked to an axle (11) which is capable of actuating the gripping head (1) by said means for transferring rotational movement, said axle (11) being located in the body of the control device (2) and being axially displaceable between two positions, the stator (13) of the electric motor being free to revolve between two limiting angular positions and being integrally locked to a first part (27-28) of the commutatable system of permanent magnets, said first part being integrally locked to support means (16) of the axle (11), a second part (29-30) of the commutatable system of permanent magnets being integrally locked to the body of the control device (2), both of said parts of the commutatable system of permanent magnets being attracted to each other when the stator (13) is occupying a first of said two angular positions, and repelling each other when the stator (13) is occupying a second of said two angular positions, and sensor means (34 or 35) at each of said angular positions of the stator (13) for transmitting a signal to the control circuit (38) whenever the stator is in the limiting angular position corresponding thereto.

12. Pincers according to claim 11, and means including a freely rotating member (14) supported by a bearing (16) for integrally locking the stator (13) to the first part (28-29) of the commutatable system of permanent magnets through the medium of said freely rotating member (14) which is supported by said bearing (16), said bearing (16) being integrally locked to the axle (11).

13. Pincers according to claim 12, wherein said freely rotating member is a ring (14).

14. Pincers according to one of the claims 12 or 13, wherein said bearing is a ball-bearing (16) has an external race integrally locked to the ring (14), the internal race being integrally locked to said axle (11).

15. Pincers according to any one of the claims 11, 12, or 13, wherein each of said parts of the commutatable system of permanent magnets comprises at least a pair of permanent magnets (27-28 or 29-30), the flux of which is generally axial in direction, one of said magnets having its North-seeking pole oriented in one direction and the other magnet having its North-seeking pole oriented in another direction, with the two magnets of said pair being situated in positions which are diametrically opposite each other, at the two limiting angular positions of the stator (13).

16. Pincers according to any one of the claims 11, 12, or 13 and an adjustable stop (32) for limiting a minimum gap between the two parts of the commutatable system of permanent magnets when they are in a position of attraction.

17. Pincers according to any one of the claims 11, 12, or 13 and an axial stop (19), integrally locked to the body of the control device (2) for limiting the displacement of said axle (11) when the two parts of the commutatable system of permanent magnets are in a position wherein they repel each other.

* * * * *